July 7, 1931.  W. H. GERSTENSLAGER  1,813,876
CORD BELT BUILDING APPARATUS
Filed Nov. 26, 1928  2 Sheets-Sheet 1
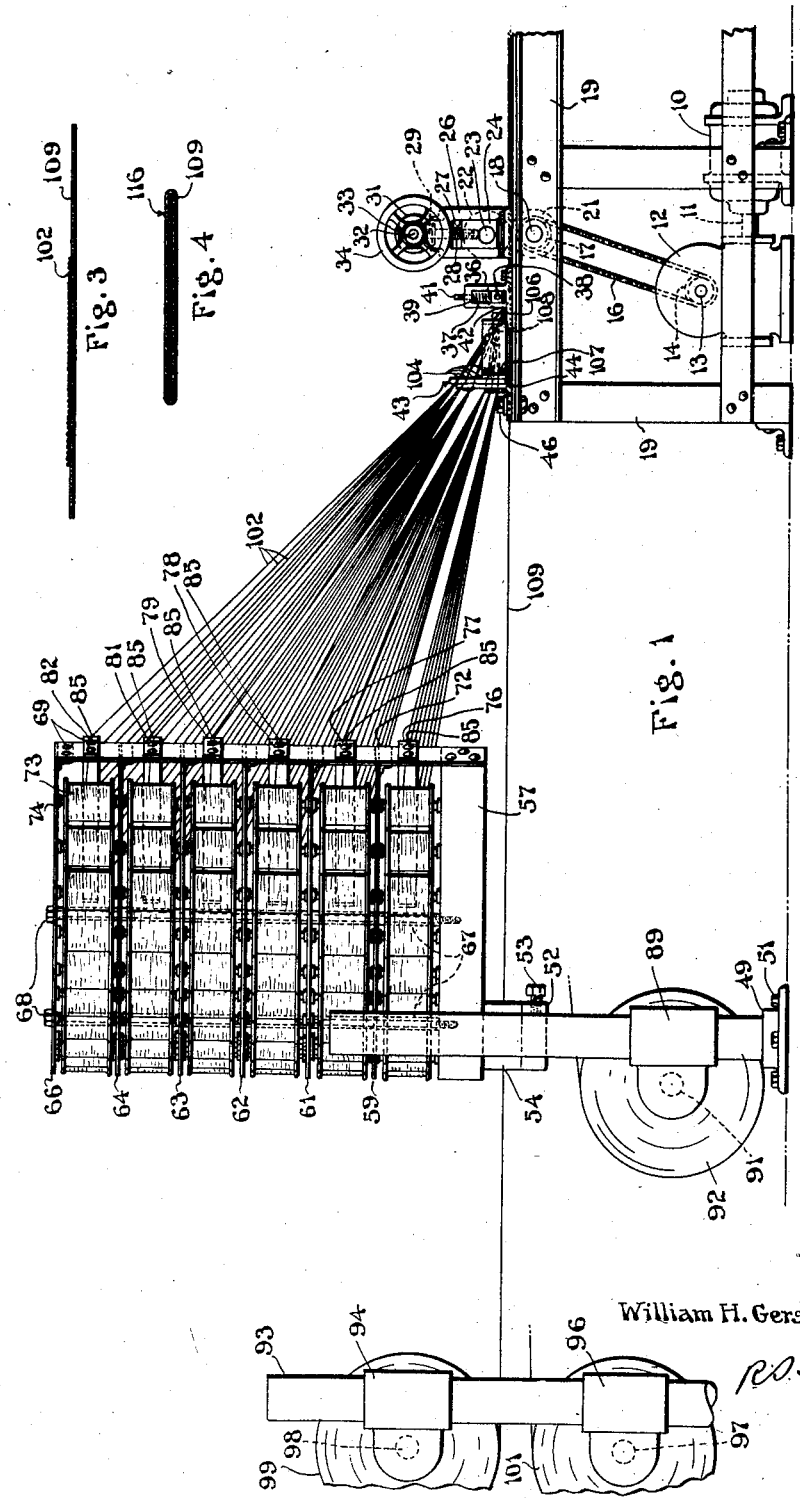

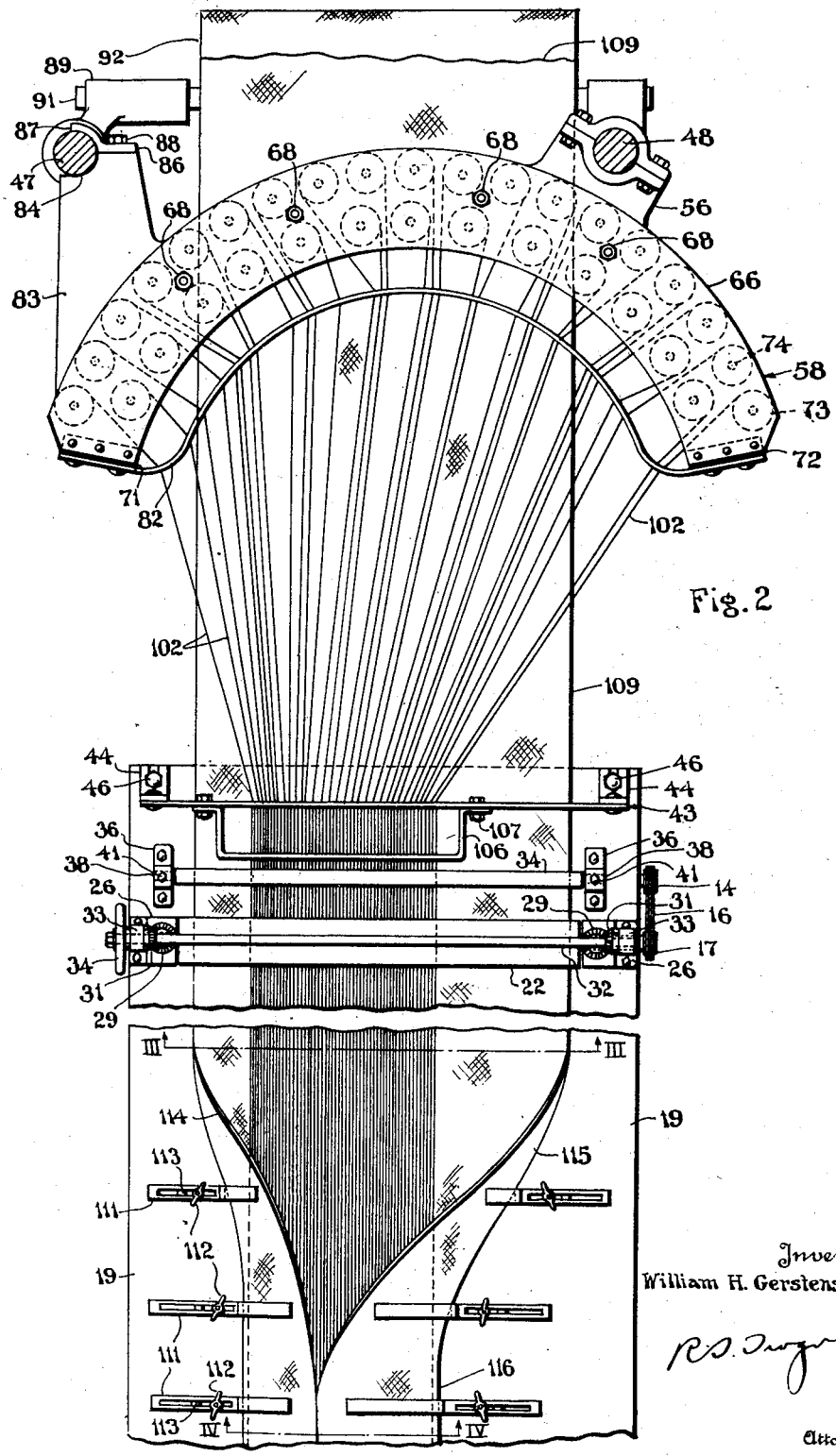

Patented July 7, 1931

1,813,876

UNITED STATES PATENT OFFICE

WILLIAM H. GERSTENSLAGER, OF AKRON, OHIO, ASSIGNOR TO THE GOODYEAR TIRE & RUBBER COMPANY, OF AKRON, OHIO, A CORPORATION OF OHIO

CORD BELT BUILDING APPARATUS

Application filed November 26, 1928. Serial No. 321,886.

The invention relates to apparatus for constructing power transmission belts, and it has particular relation to apparatus of the above designated character for constructing power transmission belts having longitudinally disposed tension elements therein.

An object of the invention is to provide an apparatus that is capable of employment with apparatus heretofore employed in the construction of laminated fabric belts.

Another object of the invention is to provide suitable mechanical units for the construction of belts embodying longitudinal reinforcing elements, which are capable of movement out of operative position when such units are not being employed.

Another object of the invention is to provide a suitable and efficient apparatus for the construction of so-called cord transmission belting upon a production scale.

The particular embodiment of the invention selected for the purpose of illustration comprises an elongate table which is disposed adjacent the ingress end of a transmission belt vulcanizing apparatus of any suitable construction. A plurality of reels rotatably mounted adjacent the opposite end of the table are adapted to supply fabric or canvas belt building or covering material to the table where the transmission belting is constructed and transported therebeyond into the vulcanizing apparatus. A creel for supporting a plurality of spools of cord is so mounted adjacent the reels of material that it may be positioned either directly in front of the end of the table to which the belt building or covering material is supplied, or it may be moved out of such position into a location where it will not interfere with workmen engaged in the construction of other belt building material in which cords are not employed. The table is provided with guiding apparatus of any suitable character and likewise with rollers or other conveying and pressing devices such as those which are now employed generally in the construction of laminated fabric transmission belting.

For a better understanding of the invention, reference may now be had to the accompanying drawings, forming a part of the specification, in which:

Fig. 1 is a fragmentary side elevational view of a belt building apparatus constructed according to one embodiment of the invention;

Fig. 2 is a plan view of a portion of the apparatus illustrated by Fig. 1;

Fig. 3 is a cross-sectional view of a partially constructed belt taken substantially on line III—III of Fig. 2; and Fig. 4 is a cross-sectional view of an assembled belt taken substantially on line IV—IV of Fig. 2.

Referring particularly to Fig. 1, a motor 10, having a drive shaft 11, is employed for driving a worm reduction gear 12 having a low speed shaft 13 projecting therefrom upon which a sprocket wheel 14 is mounted. A chain 16, driven by the sprocket wheel 14, in turn drives a sprocket wheel 17 which is rigidly mounted upon one end of a shaft 18 having journals intermediate its ends, which are received in bearings, not shown, secured rigidly to the frame of an elongate table 19 in such relation thereto that the shaft 18 is disposed slightly below the upper surface of the table and transversely thereto in a region adjacent one end thereof. The table 19, which is only partially illustrated by the drawing, may be of any desired length, such, for example, as to be capable of supporting an entire length of assembled belting material thereon or it may be relatively short and provided with a reel adjacent the opposite end thereof upon which the belting material is spirally wound. It is preferable to locate the ends of the table opposite the shaft 18 immediately adjacent the ingress end of a belt vulcanizing heater in order that the belting material may be withdrawn therefrom and inserted directly into the heater.

A roller 21, rigidly secured upon the shaft 18, is adapted to project slightly beyond the upper surface of the table 19, there to be engaged by a second roller 22, which is rigidly secured upon a shaft 23 having journals adjacent its opposite ends that are rotatably mounted in bearing blocks 24. A pair of pedestals or guide brackets 26, secured rigidly to the upper surface of the table 19, are provided with elongate openings 27, disposed normally to the upper surface of the table, in which the guide blocks 24 are slidably mounted. The upper end surfaces of the blocks 24 are provided with screw threaded openings disposed normally to the shaft 23, which are adapted to receive the threaded lower ends of a pair of rods 28. The upper ends of the rods are rotatably mounted in bearings formed in the upper ends of the brackets 26. Beveled gears 29, which are rigidly secured upon ends of the rods 28 projecting above the brackets 26, are adapted to be engaged operatively by other beveled gears 31. The gears 31 are keyed upon a shaft 32, which is rotatably mounted at opposite ends in journal bearings formed in bosses 33 projecting above the brackets 26. One end of the shaft 32 is provided with a hand wheel 34, which is rigidly secured to the rod in order to provide means for its rotation. It is apparent, when the hand wheel 34 is manipulated, that the blocks 24 and likewise the roller 22 will be moved relative to the roller 21 in a plane normal to the upper surface of the table 19.

A spaced pair of guide brackets 36, rigidly secured to the table 19 between the rollers 21 and 22 and the end of the table 19 opposite the vulcanizing heater, are adapted to receive slidably a pair of bearing blocks 37 in which the opposite ends of a shaft 38 are rotatably mounted. Springs 39, disposed between the bearing blocks 37 and the upper ends of the guide brackets 36, are adapted to be compressed variably by bolts 41 which are threaded through the upper ends of the brackets 36 and abutted by the upper ends of the springs 39. A roller 42, which is rigidly mounted on the shaft 38, is adapted to engage the upper surface of the table 19 and is resiliently retained in this position by the springs 39. A vertically disposed spacing bar 43, positioned beyond the roller 42, is rigidly secured upon the upper surface of the table 19 by angle brackets 44 and bolts 46.

Spaced a substantial distance beyond the aforesaid end of the table 19 is a pair of vertically disposed shafts 47 and 48 provided with base blocks 49 at the lower ends thereof which are secured rigidly to the floor of the building by bolts 51. A thrust ring 52, adjustably secured upon the shaft 48 by a set screw 53, is adapted to be abutted by a base portion 54 of a bearing 56, which projects from one end of an arcuate base portion 57 of a creel 58. Arcuate plates 59, 61, 62, 63, 64 and 66, disposed in spaced relation above the base 57, are adapted to be secured rigidly in this position between tubular spacing members 67 by elongate bolts 68 projecting therethrough, which are threaded in openings formed in the base 57. The end portions of the plates 59, 61, 62, 63, 64 and 66 are rigidly secured by rivets 69 to end plates 71 and 72. Any number of spools of cord or other tension resisting material 73 are rotatably mounted on spindles 74 in spaced relation to each other between each pair of the plates 66, 64, 63, 62 and 61, 59 and the base 57. Intermediate the aforesaid plates and base, and spaced toward the respective centers thereof, are guide bars 76, 77, 78, 79, 81 and 82. These bars each are provided with a plurality of openings 85 corresponding to the number of spools 73 which are mounted between each pair of the plates and base.

A bracket 83, projecting from the base 57 adjacent the opposite end thereof, is provided with an arcuately formed notch 84, which is adapted to abut a portion of the rod 47. A bar 86, having an arcuately formed portion 87 complementary to the opening 84, is removably secured to an end portion of the bracket 83 by a screw 88.

Bearings 89, secured to the rods 47 and 48 below the base 57, are adapted to support a shaft 91 upon which a reel 92 of belt building or covering fabric or canvas is supported. Other vertically disposed shafts 93, secured to the floor of the building beyond the shafts 47 and 48, likewise are provided with pairs of bearing brackets 94 and 96 adapted to support shafts 97 and 98 upon which reels 101 and 99 of belt building material of any suitable character are likewise mounted.

When it is desired to build laminated fabric transmission belting, the screw 88 is so manipulated as to permit the release of the portion 87 from engagement with the shaft 47 and the creel 58 is rotated in a counterclockwise direction into any convenient inoperative position. However, if it is desired to employ the apparatus in the construction of transmission belting having a central portion composed of longitudinally disposed cords, the creel 58 again is disposed in the operative position hereinbefore described; the cords 102 are unwound from the spools 73; projected through the openings 85 immediately in front of the respective spools; and through rows of openings 104 corresponding to the rows of spools 73 in the creel 58, which are formed in a portion of the spacing bar 43. Another portion of the spacing bar 43 comprises U-shaped bracket 106, which is secured rigidly to the main portion thereof by bolts 107 and projects forwardly therefrom toward the roller 42. This bracket likewise is provided with a pair of rows of openings 108 through which the cords 102, projecting through the openings 104 converge. From the bracket 106, the cords 102 are brought into a single horizontal plane by engagement with the lower surface of the roller 42 which presses them firmly against a central portion of a relatively wide strip of material 109, which is unwound from either of the rolls 92, 99 or 101.

While only one strip of such material is employed in this instance, it is to be understood that any number of fabric or canvas reinforcing or covering strips may be employed in addition thereto if desired. From beneath the roller 42, the strip of covering material 109, having a plurality of cords disposed in parallelism upon the central portion thereof, is projected between the rolls 21 and 22 where it is driven continuously at the will of an attendant until any desired length of such material has been assembled.

A plurality of folding devices 111, secured adjustably to the upper surface of the table 19 by wing nuts 112 and guiding lugs 113, are employed for the purpose of folding the opposite edge portions 114 and 115 of the strip of covering material 109 upon the upper surfaces of the parallel cords 102 where they are disposed either in abutting or overlapping relation. A pair of bite rollers not shown, similar to the rollers 21 and 22 may be employed therebeyond for pressing the aforesaid edge portions 114 and 115 firmly upon the upper surfaces of the cords. Thereafter, the assembled strip 116 of longitudinally reinforced belting material may be withdrawn from the table 19, when the construction thereof is complete, and vulcanized in the aforesaid belt vulcanizing heater positioned adjacent the discharge end of the table 19.

It is to be understood that the employment of many of the mechanical elements of this apparatus, for example, the folding devices 111 or the mechanically driven features of the rollers 21 and 22 may be entirely dispensed with, if desired, and instead the edges 114 and 115 of the strip 109 may be folded manually or the belting material may be drawn through the various elements of the apparatus in like manner. While these examples have been cited by way of illustration, it is obvious that other mechanical elements of the apparatus might be eliminated or modified without changing essentially the general character of the apparatus or without impairing its applicability for the construction of transmission belting of a character similar to that illustrated herein.

From the foregoing description, it is apparent that this apparatus embraces or cooperates with other machines and apparatus which have heretofore been employed in the construction of laminated fabric and other known types of transmission belting. Likewise, it will be apparent that the standard apparatus heretofore employed is still adaptable for the construction of belting material in the manufacture of which heretofore it was employed exclusively.

Although I have illustrated but the preferred form which the invention may assume and have described that form in detail, it will be apparent to those skilled in the art that the invention is not so limited but that various modifications may be made therein without departing from the spirit of the invention or from the scope of the appended claims.

What I claim is:

1. A belt building apparatus comprising a table for supporting an elongate strip of belt covering material, means for positioning a plurality of tension elements in parallel relation upon the strip, and means operating simultaneously with respect to the aforesaid means for folding edge portions of the latter upon the tension elements.

2. A belt building apparatus comprising a spacing bar for disposing a plurality of tension elements in parallel relation, means for pressing the elements upon an elongate strip of belt covering material in uniform relation to the edges thereof, and means operating simultaneously with respect to the aforesaid means for folding the edges of the covering material upon the elements.

3. A belt building apparatus including means for supporting a strip of belt covering material, a vertically disposed shaft fixed at one side of the path of the belt-covering material, a creel pivotally supported on the shaft and adapted to swing to a position over and in centered alignment with the path of the strip of belt covering material, or to a position completely away from over the path of the strip, and means for locking the creel in the aligned position.

In witness whereof, I have hereunto signed my name.

Signed at Akron, in the county of Summit and State of Ohio, U. S. A., this 24th day of November, 1928.

WILLIAM H. GERSTENSLAGER.